United States Patent [19]

Barkman

[11] 4,127,440
[45] Nov. 28, 1978

[54] PROCESS FOR PURIFYING WASTE WATER OBTAINED BY A PAPERMAKING PROCESS

[75] Inventor: Lars O. Barkman, Lilla Edet, Sweden

[73] Assignee: Edet Aktiebolag, Lilla Edet, Sweden

[21] Appl. No.: 594,772

[22] Filed: Jul. 10, 1975

[30] Foreign Application Priority Data

Jul. 10, 1974 [NL] Netherlands .......................... 7409304

[51] Int. Cl.$^2$ ............................................. D21F 1/82
[52] U.S. Cl. ....................................... 162/190; 162/55
[58] Field of Search ........... 162/190, 191, 55, DIG. 9, 162/4; 210/75

[56] References Cited

U.S. PATENT DOCUMENTS

| 2,765,915 | 10/1956 | Nilsson | 210/75 |
| 3,235,444 | 2/1966 | Kruger | 162/190 |
| 3,274,103 | 9/1966 | Adams | 210/75 |
| 3,301,745 | 1/1967 | Coppick et al. | 162/55 |
| 3,486,619 | 12/1969 | Grundelius et al. | 209/211 |
| 3,486,621 | 12/1969 | Hirs | 210/75 |
| 3,577,339 | 5/1971 | Buird et al. | 210/75 |
| 3,912,579 | 10/1975 | Braun | 162/55 |

Primary Examiner—S. Leon Bashore
Assistant Examiner—William F. Smith
Attorney, Agent, or Firm—Stevens, Davis, Miller & Mosher

[57] ABSTRACT

The waste water obtained from a papermaking process is purified to remove the last traces of fibers suspended in the water by mixing the waste water with those contaminating materials that are separated from the paper pulp suspension before it is fed to the papermaking machine. These contaminants act as a filter aid and make it possible to separate the fibers remaining in the water phase after the water from the papermaking machine has been subjected to a flocculating process, filtering and screening.

3 Claims, 1 Drawing Figure

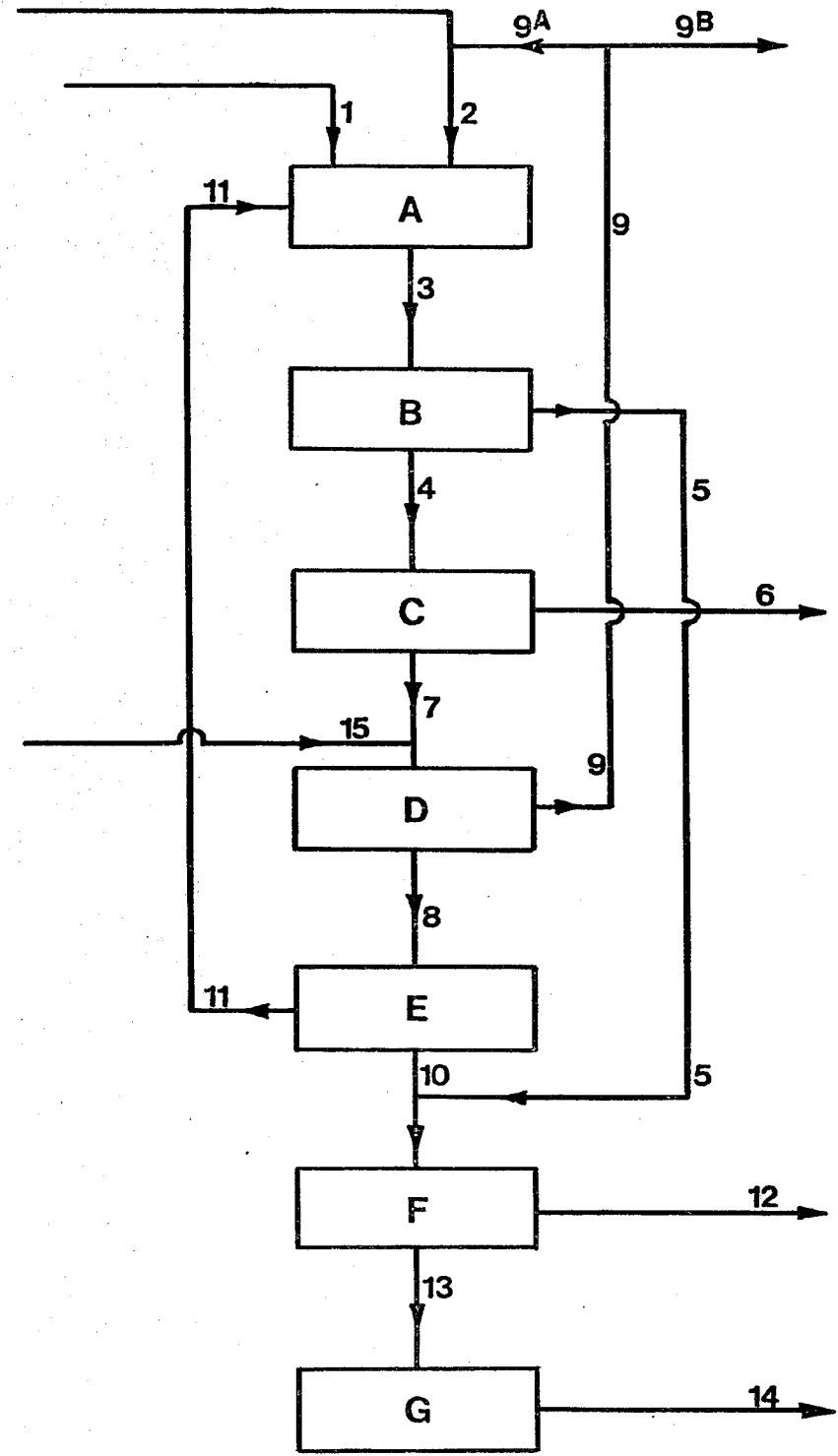

PROCESS FOR PURIFYING WASTE WATER OBTAINED BY A PAPERMAKING PROCESS

This invention relates to a process for the purification of waste water from papermaking processes.

The invention more particularly relates to a process for the separation of solid constituents from waste water obtained in a papermaking process in which the raw material entirely or partly consists of printed waste paper, from which waste water the fibers that can still be used have been substantially removed.

In conventional papermaking processes a fibrous slurry, hereinafter referred to as pulp, is passed over a screen. The water runs through the screen and the fibers are retained by it; the sheet or mat of fibers thus formed is subsequently subjected to a series of treatments by which it is processed into paper. It is not possible for all fibers to be retained by the screen and the discharged water will still contain a certain amount of fibers. Depending on the raw material used, the water will also contain some other solid particles. In the past it was for reasons of economy as a rule not considered justified to remove the solid constituents from this water, which was therefore discharged into public waterways without further purification.

Gradually, however, it has been realized that the discharge of such water leads to unacceptable environmental pollution. The removal of solid particles from such waste water has therefore been applied on a large scale and consists in the addition to it of chemical substances such as aluminium compounds so that solid substances such as aluminium hydroxide will form which precipitate along with the solid particles contained in the water. The precipitate can then be separated from the water which can be disposed of subsequently or reintroduced into the process. The resulting precipitate contains a considerable amount of fibers which can be re-used in papermaking. The precipitate cannot be fed back into the pulp because it contains constituents which affect the quality of the paper.

This is particularly the case if as raw material in the papermaking process printed waste paper has been used. The precipitate will then, for instance, contain carbon black particles and other substances from printers ink and from agents used in the manufacture of this paper.

Now it is possible for the constituents of the precipitate that are detrimental to the paper quality to be removed by, for instance, screening the precipitate by means of, say, a sieve bend. This will lead on the one hand to obtaining a valuable fibrous slurry and, on the other, to obtaining a substantially fiber-free suspension. It is not justified to discharge this suspension into public waterways without purification. Its solids content is so low, however, that it must be thickened. But this is not found possible without taking special steps. One step, for instance, consists in adding to the suspension a filter aid commonly used in the art, after which the suspension can be thickened by filtration. The costs of the usual filter aids, however, are so high that in most cases it is preferred not to separate the fibers that are still suitable to be used. The precipitate is therefore thickened without using a filter aid, for instance, by filtration and compacting in a screw press. The resulting solid mass, which still contains about 20% water is disposed of in the form of solid waste at a refuse dump.

An object of the invention is to provide a process for purifying waste water from a papermaking process. Another object of the invention is to provide an improved process for separating the fibers remaining in the aqueous phase after paper pulp has been separated therefrom by a papermaking machine and thereby avoid pollution of the stream into which the waste water is discharged. A more specific object of the invention is to provide a process for separating fibers in waste water in a papermaking machine after the waste water has been screened to remove substantially all of the fibrous material remaining therein. Still another object of the invention is to provide a means for improving the environment.

Other objects will become apparent from the following description with reference to the accompanying drawing wherein the only FIGURE is a flow sheet of an embodiment of the process of the invention.

It has now been found that the suspension from which the usuable fibers have been substantially separated and which cannot be directly filtered can be rendered satisfactorally filterable by adding to it the material which has been mechanically removed from the paper pulp prior to the actual papermaking process. Accordingly, the foregoing objects and others are accomplished in accordance with this invention generally speaking by providing in a papermaking process wherein an aqueous slurry of paper pulp and the usual contaminants carried into the slurry is separated into (1) the contaminants and (2) an aqueous fibrous paper pulp suspension which is substantially free from the contaminants, the aqueous fibrous paper pulp suspension is then fed to a papermaking machine where the paper pulp is separated from the water, a flocculating agent such as aluminium sulphate or the like is mixed with the water to form solid substances such as aluminium hydroxide which will precipitate therefrom, fibrous material remaining suspended in the water is substantially removed by screening and the resulting aqueous phase is then mixed with the contaminants 1 as a filtering aid. The resulting mixture of water and filtering aid is separated into a filter cake and purified waste water which can be safely discharged into a stream.

The material containing the contaminants 1 generally consists of a mixture of heavy particles such as sand, clay and substances contained in the waste paper as fillers. It may contain small particles of plastic film of, for instance, polyethylene. This film is incorporated in the waste paper as such or in the form of a paper coating. When the raw material is being processed into pulp, this film is torn into particles having a size of, for instance, one or a few millimeters.

Especially if groundwood is used as raw material, said material will also contain fiber knots, which consist of small pieces of fiberized wood which have not been crushed into loose fibers. This material, which has so far been regarded as entirely useless, has been found to be capable of rendering the above-mentioned suspension perfectly filterable. The filter cake thus formed upon filtration will contain in solid and readily dischargeable form all constituents contained in the raw material that are detrimental to the papermaking process and that are to be mechanically separated from the pulp, namely the coarse or heavy constituents such as fiber knots, sand, clay and small pieces of plastic as well as the fine constituents that are difficult to filter, such as carbon black particles and slimy impurities. The great advantage of the process according to the invention consists in that from the waste water still valuable fibers are recovered without there being any need to add costly filter aid, which moreover lead to an increase in the volume of the final waste material.

The use of the process according to the invention makes it possible to decrease substantially the percentage usable fibers that will get into the waste material. As a result, there is, on the one hand, a substantial recovery of valuable fibers and, on the other, a large reduction of the amount of waste, which is interesting both as far as cost saving and environmental protection are concerned.

The filter aid to be used according to the invention is formed as waste material in the preparation of pulp and may, for instance, be obtained in such a way that during the preparation of the pulp the fiber suspension is fractionated, say, by means of cyclones. Such a waste material may, for instance, have the following composition:

20% by weight of a synthetic material, predominantly polyethylene;

40% by weight of wood particles (fiber knots); 40% by weight of inorganic material such as sand and clay. This is, of course, merely an example of a suitable product. Its composition may vary depending on the composition of the starting material. It has been found that in all cases where use was made of a raw material containing printed paper and groundwood a material is obtained which is suitable to be used in the process according to the invention.

It should be added that from the U.S. Pat. No. 3,574,098, it is known to add to waste water powdered newsprint freed from residual oil. The powdered material is first more or less carbonized and then acts as a flocculant. From this patent follows the detrimental effect of the presence of oil contained in the printing ink. According to column 3, lines 56–64 of this patent, this oil presents the precipitation of solid constituents in a filterable form and according to said patent this oil must therefore be removed by extraction with perchloroethylene. It is therefore surprising that by the process according to the invention it should be possible to filter off precipitates containing relatively large proportions of such oils.

The invention will be further explained with reference to the accompanying drawing.

In the drawing, the various apparatuses are indicated with rectangles. The rectangles are referred to by letters. The various product streams are referred to by numerals. The letter A refers to a known apparatus into which raw materials 1, which in this case consists at least partly of printed waste paper, and water 2 are fed and subsequently processed into a fibrous slurry 3. This fibrous slurry 3 is fed to a pulp purifier B, which may consist of a number of cyclones. In this purifier it is freed from heavy constituents such as sand, clay, fillers, and coarse particles in the form of pieces of plastic and fiber knots. The separated material is discharged from the pulp purifier B as stream 5. The purified pulp passes as stream 4 to a papermaking machine C on which the purified pulp is made into paper which leaves the machine as stream 6. To the water leaving the paper-making machine C as stream 7 there is added a flocculant 15, such as aluminium sulphate or the like, after which in a sedimentation apparatus D (this may of course be a centrifuge) the flocs thus formed will separate from the water. The water freed from solid constituents is discharged from the sedimentation apparatus D as stream 9, part of which is fed back into the plant as stream 9A and is re-used as process water, whereas another part is discharged as stream 9B.

The still highly watery, flocculent mass separated in the sedimentation apparatus D is fed as stream 8 to a screening apparatus E in which the fibers contained in the mass may be separated by means of, for instance, sieve bends. These fibers are fed back to A as stream 11. The highly watery, slimy mass largely freed from fibers leaves the screening apparatus E as stream 10. Added to this stream 10 is the material 5 separated in B, after which the joined streams 5 and 10 are filtered in the filtration apparatus F. The water then separated is discharged as stream 12 and the resulting filter cake is fed as stream 13 to a compacting apparatus G in which it is thickened to a solid product 14, which may be sent to a refuse dump or to an incinerator.

The flow chart given in the accompanying drawing is, of course, not to be regarded as limiting the scope of the invention. Depending upon the composition of the raw material, it is possible for instance, that only part of stream 5 is mixed with stream 10. Or other commonly practiced steps may be taken that are not apparent from the scheme.

The invention will be further described in the following examples:

EXAMPLES

Paper A is manufactured from raw materials mentioned in the table under A. These raw materials are converted into fiber suspensions in a hydropulper. These fiber suspensions are freed from coarse and heavy particles by means of hydrocyclones. The separated particles form a waste which will later on be used as filter aid.

The fiber suspensions (pulp) thus obtained are processed into paper on a papermaking machine. Each $m^3$ of waste water leaving the papermaking machine contains from 0.3 kg (with the raw material entirely made up of cellulose) to 2.5 kg (with the raw material entirely made up of printed paper) solid material which mainly consists of fibers having a shorter length than the average fiber length of the starting material. The total amount of the solid material contained in the waste water is given in the table under B. To each cubic meter of waste water the papermaking machine there are added 25 g of aluminium sulphate ($Al_2(SO_4)_3 \cdot 18H_2O$), after which there is formed a precipitate which contains hydrated aluminium oxide, fibers, carbon black particles and other, more or less slimy, solid constituents of the waste water. This precipitate is separated by means of sedimentation. It is passed over a sieve bend where the fibers contained in it are separated (the amount is given in the table under C).

The separated fibers are reintroduced into the pulp. The suspensions leaving the sieve bend are not filterable in the runs 1 through 4. In the runs 5 through 7, where no printed paper is present in the starting material, filtration does not give any great difficulties. To the suspensions which contain only few fibers there is added the above waste, after which they are passed over a rotary disc filter. On the filter the undissolved impurities separate to form a filter cake which has a good permeability. The filter cake can readily be removed from the filter. In a screw press the cake is thickened to a solid mass which can be discharged as such.

| Run | A Composition raw material in percentages by weight | | | B Solid matter in kg per 1000 kg raw material present in the waste water immediately after the papermaking machine | C Fiber yield in kg dry fibers per 1000 kg raw material |
|---|---|---|---|---|---|
| | printed paper | ground wood | cellulose | | |
| 1 | 100 | 0 | 0 | 140 | 80 |
| 2 | 50 | 50 | 0 | 85 | 45 |
| 3 | 30 | 0 | 70 | 45 | 30 |
| 4 | 20 | 0 | 80 | 40 | 34 |
| 5 | 0 | 40 | 60 | 50 | 35 |
| 6 | 0 | 20 | 80 | 40 | 35 |
| 7 | 0 | 0 | 100 | 40 | 37 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a papermaking process wherein an aqueous slurry containing paper pulp and non-fibrous material is prepared, the slurry is separated into (1) non-fibrous material and (2) an aqueous fibrous paper pulp suspension substantially free from non-fibrous material, the aqueous fibrous paper pulp suspension is fed to a papermaking machine where the paper pulp is separated from the water, a flocculating agent is mixed with the separated water, the resulting flocculent mass is screened to separate it into a fibrous mass and a water phase having non-fibrous solid waste suspended therein, the improvement comprising removing any fibers remaining in the water after the screening step by the method which comprises mixing the water from the screening step with the said non-fibrous material (1) as a filtering aid, and separating the resulting mixture into a filter cake of fibers and water which may be safely discharged into a stream.

2. In a process for removing solids from waste water obtained in a paper making process which comprises forming a slurry from fibrous raw material containing printed paper, said slurry containing fibrous and non-fibrous materials, separating the non-fibrous materials from the slurry, making paper from fibrous material in the slurry whereby waste water is obtained having fibers which are not used in the paper making process suspended therein, and removing solid constituents in the waste water by mixing the waste water with a flocculating agent and separating the resulting flocculated material into a fibrous mass and a substantially fiber-free suspension of solid waste in water, adding a filter aid to the said suspension and separating the suspended solid from the water, the improvement which comprises mixing the said non-fibrous material separated from the slurry prior to the paper making step with the said suspension as the said filter aid prior to separation of the said suspended solid from the water.

3. In a process for making paper wherein the paper is made from pulp which is derived from an aqueous slurry containing fibers which are too fine to be used by a paper making machine and non-fibrous material, the steps which comprise
   (1) separating the solid non-fibrous material from the aqueous slurry of fibers prior to paper making,
   (2) flowing the resulting aqueous slurry from (1) which contains the fibers to a paper making machine where the fibers are separated from the aqueous phase,
   (3) mixing the aqueous phase from (2) with a flocculating agent,
   (4) separating the resulting flocculent mass obtained in (3) from the water phase,
   (5) screening the flocculent mass to separate it into a fibrous mass and a water phase having non-fibrous solid waste suspended therein;
   (6) mixing the fibrous mass of (5) with the slurry which is charged to the paper making machine in (2),
   (7) mixing the water phase from (5) with the said solid non-fibrous material obtained from (1), and
   (8) filtering the resulting mixture with the non-fibrous material obtained from (1) acting as a filtering aid.

* * * * *